US008375287B2

(12) United States Patent
Bank et al.

(10) Patent No.: US 8,375,287 B2
(45) Date of Patent: Feb. 12, 2013

(54) REPOSITIONING OF HYPERLINKS FOR COMMON FUNCTIONS

(75) Inventors: Judith H. Bank, Morrisville, NC (US);
Lisa M. W. Bradley, Cary, NC (US);
Lin Sun, Morrisville, NC (US);
Chunhui Yang, Durham, NC (US)

(73) Assignee: International Business Machines Corporation, Armonk, NY (US)

( * ) Notice: Subject to any disclaimer, the term of this patent is extended or adjusted under 35 U.S.C. 154(b) by 100 days.

(21) Appl. No.: 12/845,306

(22) Filed: Jul. 28, 2010

(65) Prior Publication Data
US 2012/0030551 A1    Feb. 2, 2012

(51) Int. Cl.
*G06F 17/00* (2006.01)
(52) U.S. Cl. .................. 715/208; 715/206; 715/207
(58) Field of Classification Search .................. 715/206, 715/205, 207
See application file for complete search history.

(56) References Cited

U.S. PATENT DOCUMENTS

| 6,405,238 | B1* | 6/2002 | Votipka .................. 709/203 |
| 7,475,353 | B2 | 1/2009 | Nuzzi |
| 7,788,245 | B1* | 8/2010 | Eddings et al. ............... 707/705 |
| 2002/0075299 | A1 | 6/2002 | Tobin et al. |
| 2003/0184582 | A1* | 10/2003 | Cohen ........................... 345/736 |
| 2005/0278537 | A1* | 12/2005 | Kirkland et al. .............. 713/182 |
| 2009/0158180 | A1 | 6/2009 | Magnani et al. |
| 2009/0177997 | A1 | 7/2009 | Do et al. |
| 2009/0216724 | A1* | 8/2009 | Cai et al. ........................... 707/3 |
| 2009/0228840 | A1 | 9/2009 | Stach |

OTHER PUBLICATIONS

Lieuallen, A., et al., "Greasemonkey 0.8.20100408.6" https://addons.mozilla.org/en-US/firefox/addon/748/, Updated Apr. 8, 2010, pp. 1-6.
Turner, S. "Platypus" http://platypus.mozdev.org/, Copyright 2000-2011, Retrieved Jul. 28, 2010, pp. 1-3.
Webalo, Inc., "Webalo" http://www.webalo.com/, 2009, pp. 1.
Kapow Technologies, "Web Data Access, Extraction and Harvesting" http://kapowtech.com, 2009, pp. 1.
"Coscripter: Simplifying Web-Based Processes" http://coscripter.researchlabs.ibm.com/coscripter, Retrieved Dec. 16, 2011, pp. 1-2.

* cited by examiner

*Primary Examiner* — Adam M Queler
*Assistant Examiner* — Howard Cortes
(74) *Attorney, Agent, or Firm* — Law Office of Jim Boice

(57) ABSTRACT

In one embodiment, common functions of hyperlinks are listed and associated with alternative terms, which may be words and phrases that are commonly used to identify hyperlinks in web pages and other documents. A common icon is associated with each common function, and a predetermined position on a display screen is assigned to each common icon. The alternative terms for each common function are compared to each of the hyperlinks in a source document. If a hyperlink matches an alternative term of a common function, the target resource locator from that hyperlink, which points to a target document, is associated with that common function. The corresponding common icon is displayed at its predetermined position on a display screen in the form of a common function hyperlink, which includes the target resource locator. Activating the common function hyperlink redirects the application to the target document.

12 Claims, 3 Drawing Sheets

REPOSITIONING OF HYPERLINKS FOR COMMON FUNCTIONS

BACKGROUND

The present invention relates to computers, and other data processing systems and software and, more specifically, to the positioning of hyperlinks for common functions at predetermined positions on a display screen.

Hyperlinks from different and unrelated websites often point to target web pages that have similar functions. However, despite the fact that their target web pages have similar functions, these hyperlinks are frequently identified differently, and are located at different positions on their respective web pages. For example, hyperlinks that lead to a target web page that allows a user to sign in to an account by entering a user ID and password, may be labeled "login", "log in", "logon" "log on", "sign in", "sign on" or "your account." Similarly, hyperlinks of shopping websites that lead to a target web page that allows a user to search for a local retail store may be labeled "stores", "store locator", "store finder", "locations", "find store", "find a store" and "my local store."

SUMMARY

According to one embodiment, a method includes storing, in a storage device of a data processing system, a common icon to represent a common function of a hyperlink. A predetermined display screen position is stored at which the common icon may be displayed. The common function is associated with a plurality of alternative terms suitable to identify the common function. A source document comprising a source hyperlink is opened. The source hyperlink includes a target resource locator that points to a target document. A common function hyperlink is formed from the common icon and the target resource locator. The source document and the common function hyperlink are displayed on a display screen with the common icon of the common function hyperlink being displayed at the predetermined display screen position. The target document is opened in response to activation of the common function hyperlink.

According to another embodiment, a computer program product includes a computer readable storage medium having computer readable program code embodied therewith. The computer readable program code is configured to store a common icon to represent a common function of a hyperlink. The program code is configured to store a predetermined screen position at which to display the common icon. The program code is configured to associate the common function with a plurality of alternative terms suitable to identify the common function. The program code is configured to open a source document including a source hyperlink, where the source hyperlink includes a target resource locator that points to a target document. The program code is configured to form a common function hyperlink from the common icon and the target resource locator. The program code is configured to display the source document and the common function hyperlink on a display screen, where the common icon of the common function hyperlink is displayed at the predetermined screen position. The program code is further configured to open the target document in response to activation of the common function hyperlink.

According to another embodiment, an apparatus includes a storage device having computer executable code, and a processor coupled to the storage device. The processor executes the computer executable code to direct the apparatus to store a common icon to represent a common function of a hyperlink. A predetermined screen position at which to display a common icon is stored. The common function is associated with a plurality of alternative terms suitable to identify the common function. A source document including a source hyperlink is opened, where the source hyperlink includes a target resource locator that points to a target document. A common function hyperlink is formed from the common icon and the target resource locator. The source document and the common function hyperlink are displayed on a display screen, where the common icon of the common function hyperlink is displayed at the predetermined screen position. The target document is opened in response to activation of the common function hyperlink.

DETAILED DESCRIPTION

Figure 1:
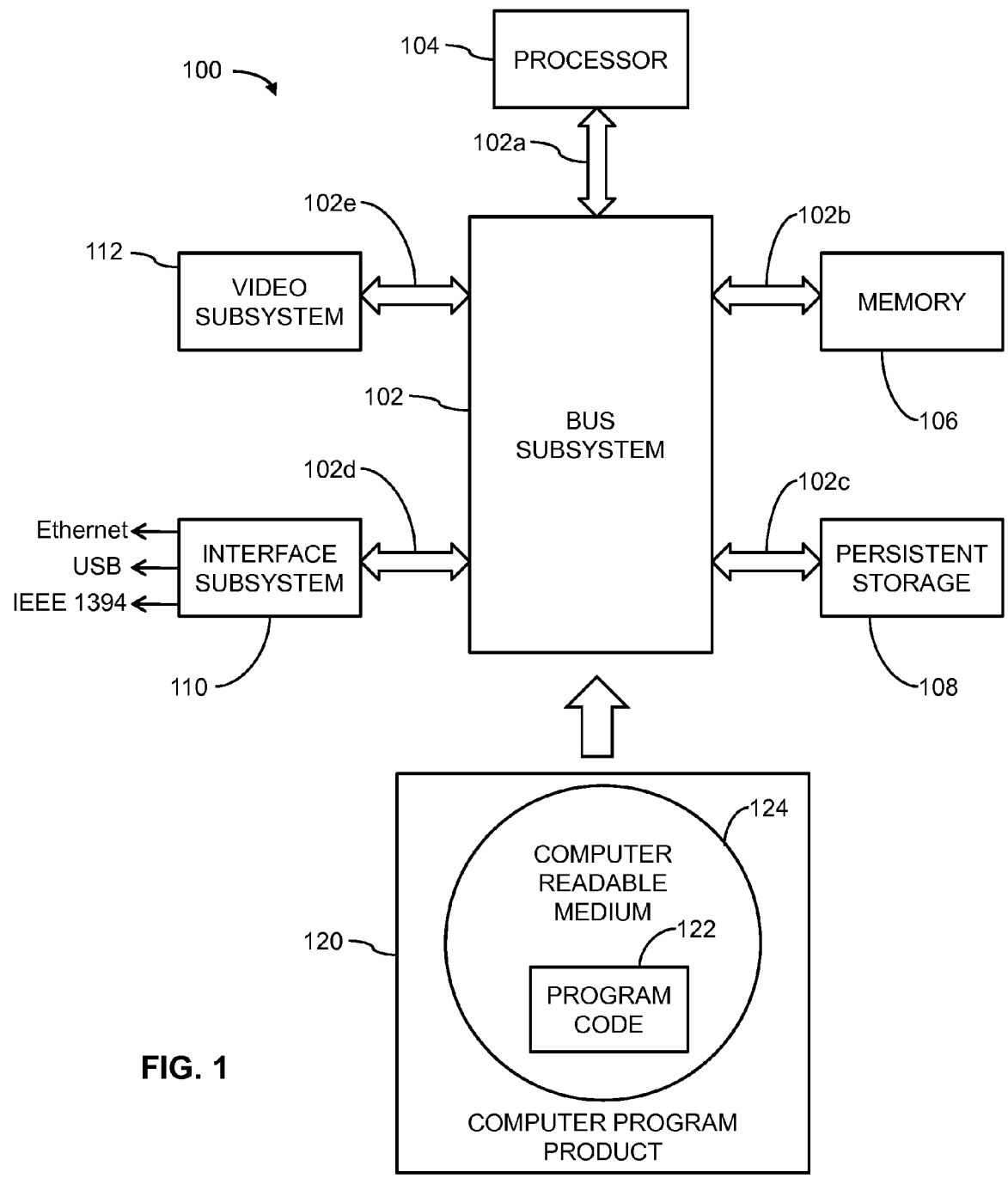
FIG. 1 is a block diagram of an exemplary computer or other data processing system in which various embodiments of the present invention may be implemented.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system."

Aspects of the present invention may take the form of a computer program product embodied in one or more computer readable medium(s) having computer readable program code embodied thereon. Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus or device.

A computer readable signal medium may include a propagated data signal with computer readable program code embodied therein, for example, in baseband or as part of a carrier wave. Such a propagated signal may take any of a variety of forms including, but not limited to, electro-magnetic, optical or any suitable combination thereof. A computer readable signal medium may be any computer readable medium that is not a computer readable storage medium and that can communicate, propagate or transport a program for use by or in connection with an instruction execution system, apparatus or device. Program code embodied in a computer readable signal medium may be transmitted using any appropriate medium including, but not limited to, wireless, wire line, optical fiber cable, RF, etc., or any suitable combination of the foregoing.

Computer program code for carrying out operations of the present invention may be written in any combination of one or more programming languages, including an object oriented programming language such as Java™, Smalltalk, C++ or the like, and conventional procedural programming languages, such as the "C" programming language or similar programming languages. (Java and all Java-based trademarks and logos are trademarks of Sun Microsystems, Inc., in the United States, other countries or both.) The program code may execute entirely on the user's computer, partly on the user's computer, as a stand-alone software package, partly on the user's computer and partly on a remote computer, or entirely on a remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus, systems and computer program products according to various embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer or other programmable data processing apparatus to function in a particular manner, such that the instructions stored in the computer readable medium produce an article of manufacture including instructions which implement the function/act specified in the flowchart and/or block diagram block or blocks. The computer program instructions may also be loaded onto a computer or other programmable data processing apparatus to cause a series of operational steps to be performed in the computer or other programmable apparatus to produce a computer-implemented process, such that the instructions that execute in the computer or other programmable apparatus provide processes for implementing the functions/acts specified in the flowchart and/or block diagram block or blocks.

FIG. 1 is a block diagram of an exemplary computer or other data processing system in which various embodiments of the present invention may be implemented. Referring to this figure, bus subsystem 102 interconnects the various components of data processing system 100, such as processor 104, memory 106, persistent storage 108, interface subsystem 110 and video subsystem 112. Bus subsystem 102 preferably includes one or more computer buses, and may also include one or more circuits to interconnect the various buses and components of data processing system 100. These circuits may include memory controllers, input/output controllers, and bridge circuits that bridge from one bus technology to another.

The terms "bus" and "bus subsystem" should be broadly interpreted to include other technologies or combinations thereof in which power, timing, data or other signals are transferred between the various components of a data processing system, or between two or more data processing systems. For example, technologies commonly classified as network and input/output, such as Ethernet and USB, and various wired, wireless, optical and infrared communication technologies may also be used to interconnect the various components of data processing system 100.

Processor 104 is connected to bus subsystem 102 via bus 102a, such as a well known Front Side Bus. Processor 104 is, preferably, a well known integrated circuit, central processing unit (CPU), but it may be any data processing subsystem that processes data or executes computer program instructions, which are also known as computer executable code, computer readable program code, and similar terms. These computer program instructions and data are loaded into memory 106, which is coupled to processor 104 via memory bus 102b, bus subsystem 102, and bus 102a. Processor 104, in combination with a memory controller circuit in bus subsystem 102, fetches the data and program instructions stored in memory 106. Memory 106 may be any memory or storage device that is capable of storing and retrieving data or program instructions, but is preferably one or more semiconductor, random access memory (RAM) circuits.

Persistent storage 108 is used to store data, program instructions and other information on a more permanent or persistent basis than that of memory 106, which typically uses a fast but volatile memory technology wherein all information is lost if the power to the memory is disrupted. Persistent storage 108 is coupled to bus subsystem 102 via storage bus 102c, examples of which include well known IDE, SATA and SCSI buses, although other bus technologies may also be used. Data, program instructions and other information may be stored in persistent storage 108, and loaded into memory 106. Persistent storage 108 is coupled to memory 106 via bus 102c, an I/O controller circuit and a memory controller circuit in bus subsystem 102, and memory bus 102b.

Persistent storage may be any memory or information storage device that is capable of storing data, program instructions or other information. Examples of typical persistent storage devices include magnetic storage devices (such as a hard disk drive), optical storage devices (such as a CD-ROM) and semiconductor storage devices (such as EEPROMs and flash memory). Persistent storage 108 may also include drives, connectors or other devices that accept removable storage media, such as floppy magnetic disks, optical disks and semiconductor flash memory. Persistent storage 108, as well as memory 106, may be internally located within data processing system 100, or externally located and coupled to the data processing system through Interface subsystem 110.

Interface subsystem 110 is coupled to bus subsystem 102 via bus 102d. Interface subsystem 110 may include one or more input/output (I/O) and network ports to which devices, systems and networks that are external to data processing system 100 can be connected. Examples of such devices, systems and networks include keyboards, pointing devices (such as a mouse), printers, scanners, storage devices, local area networks (LANs), wide area networks (WANs), and other data processing systems. Each of these I/O and network ports may be implemented in a different I/O or network technology, examples of which include Universal Serial Bus (USB), Ethernet, IEEE 1394 (FireWire), Small Computer System Interface (SCSI) and IEEE 802.11 (wireless LAN). In some data processing systems, portions of interface subsystem 110 may be implemented in an I/O controller circuit that is part of bus subsystem 102.

Video subsystem 112, the output of which may be connected to a video display, is coupled to bus subsystem 102 via video bus 102e. Examples of video bus technologies include Accelerate Graphics Port (AGP) and PCI Express, although other bus technologies may be used to implement video bus 102e.

A computer program product 120 includes computer readable program code 122 embodied in a computer readable medium 124. Computer readable medium 124 may include memory 106, persistent storage 108 or any storage device, including a storage device that is external to data processing system 100. An external storage device may be coupled to data processing system 100 through interface subsystem 110 or otherwise. Computer readable medium 124 may also be a removable storage medium that is capable of being inserted into an internal or external drive, or other device that is adapted to read the removable storage medium. Other examples, variations and details of a computer program product, a computer readable medium and computer program code are described above.

Figure 2:
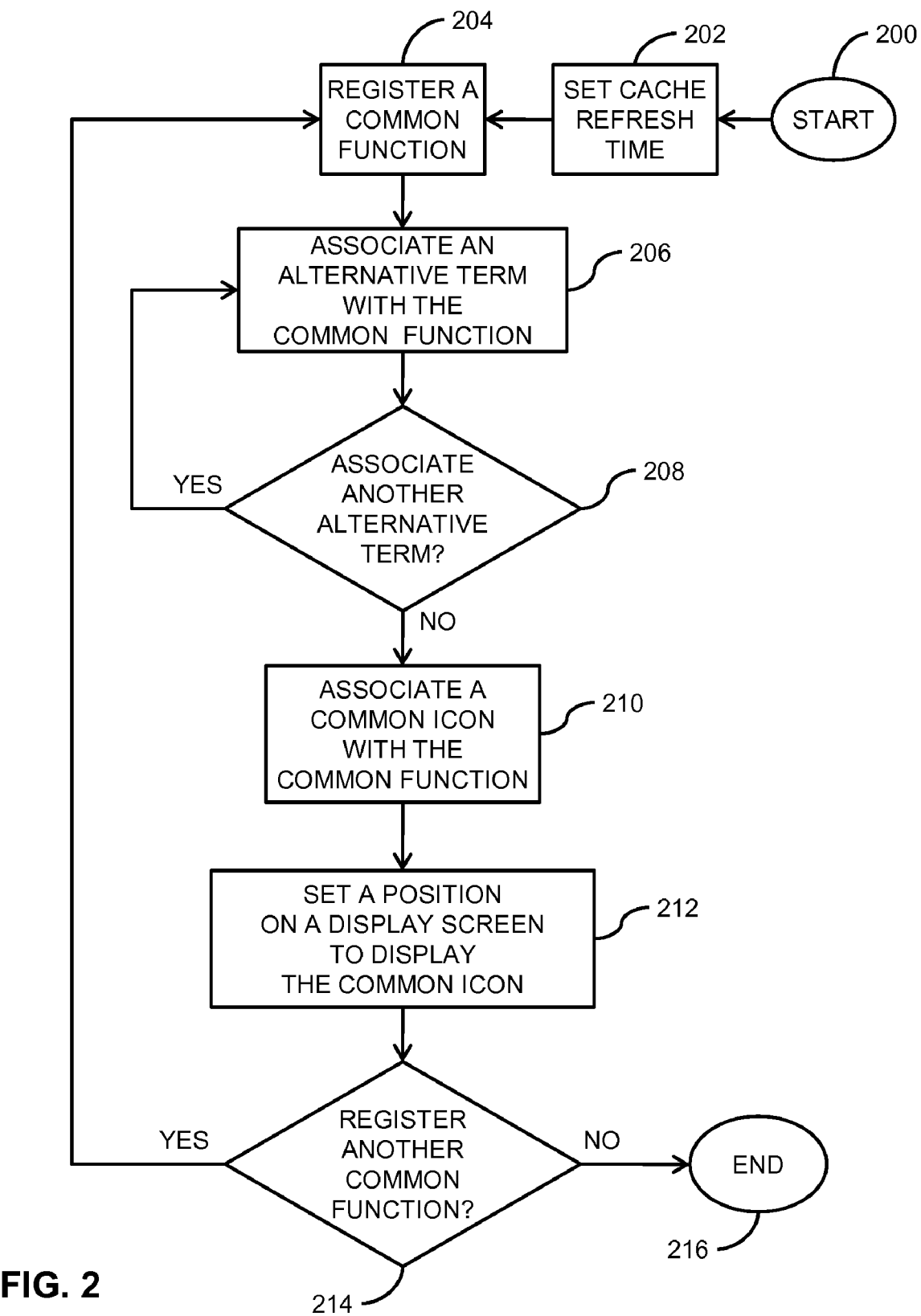
FIG. 2 is a flowchart of an embodiment of the present invention in which common functions are listed and associated with alternative terms, common icons and display screen positions for the common icons.

FIG. 2 is a flowchart of an embodiment of the present invention in which common functions are listed and associated with alternative terms, common icons and display screen positions for the common icons. Referring to this figure, the process starts at step 200. In step 202, a cache refresh time is set. The function of the cache refresh time will be described in more detail below.

In step 204, a common function is registered by adding it to a list or table of common functions stored in memory or other storage device. A common function is a function of a hyperlink that may be common to more than one webpage, website, document or group of documents. An example of a hyperlink having a common function would be a "login" hyperlink, which is a link that points to a webpage or other document in which a user may enter a user ID and password needed to access an account. Another example of a hyperlink having a common function would be a "check out" hyperlink, which is a link that points to a web page or other document of a shopping site in which the user may enter shipping and payment information needed to complete their order. However, the term "common functions", as it is used in the specification and claims, would also include other "favorite functions" that a user may choose and that are not common to more than one webpage, website, document or group of documents but, instead, are only found in one place. The term "hyperlink" is used throughout the specification and claims to include, not only a traditional hyperlink as found on the World Wide Web and written in HTML, but any link written in any language that may be activated from a source page to redirect the user to a target page (or to a target section of the source or other page).

In step 206, an alternate term is associated with the common function in the table of common functions in memory. Examples of alternate terms for the common function "login" would be "login", "log in", "logon" "log on", "sign in", "sign on" and "your account." If there is more than one alternative term for a common function, step 208 branches back to step 206 wherein an additional alternative term may be associated with the common function in the table of common functions. Once all alternative terms have been associated with the common function, step 208 branches to step 210.

In step 210, a common icon is associated with the common function in the table of common functions. A display screen position for displaying the common icon is set in step 212 and associated with the common function in the table of common functions. As will be seen in more detail below, the common icon will be displayed at the same predetermined screen position for any webpage or other document in which one of the alternative terms for the corresponding common function has been used to identify a hyperlink. In step 214, if another common function is to be registered in the table of common functions, the process branches back to step 204. Otherwise, the process branches from step 214 to step 216, where the process ends.

Figure 3:
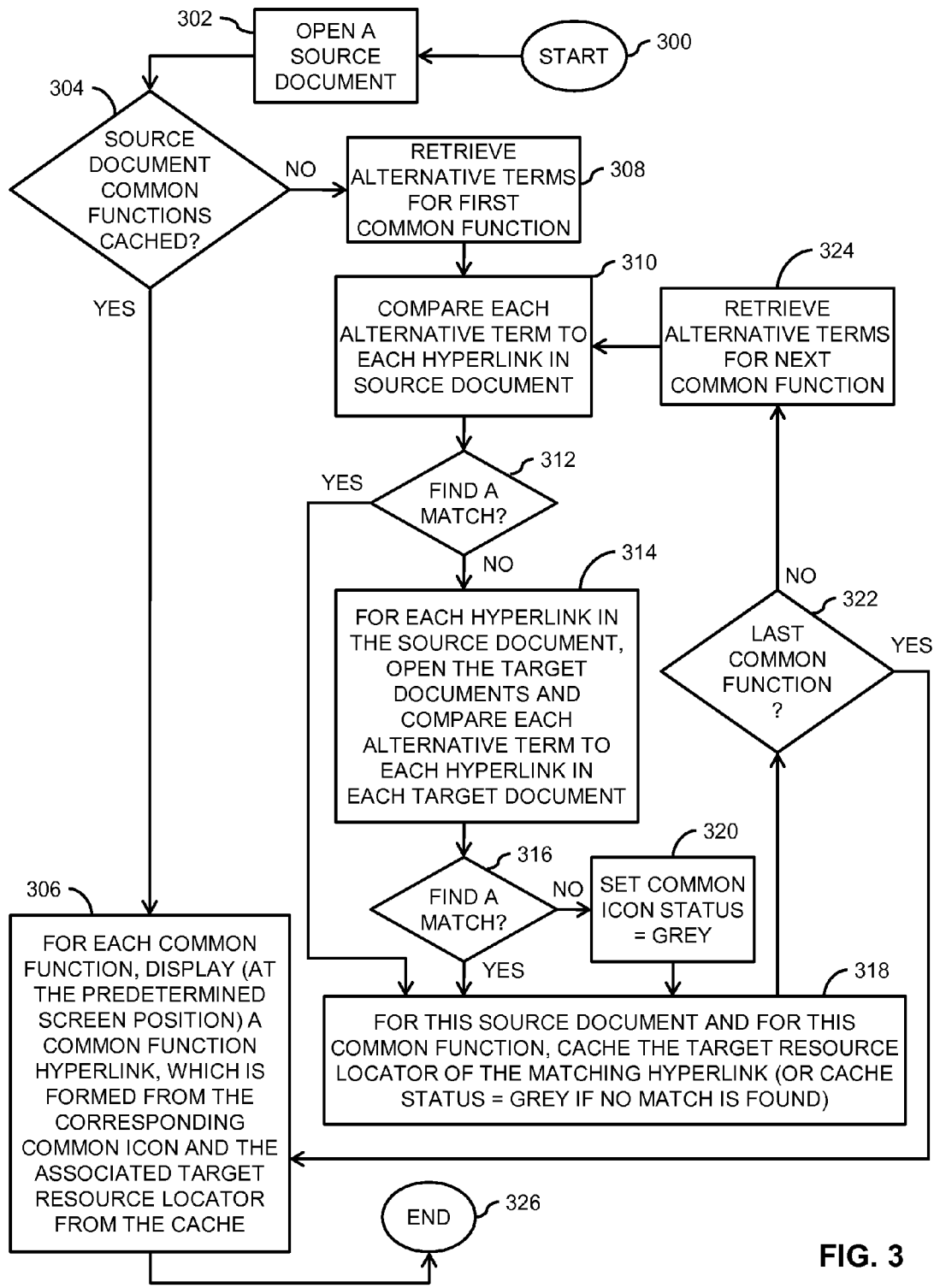
FIG. 3 is a flowchart of an embodiment of the invention in which common functions are found in a source document by comparing the hyperlinks of the source document with alternative terms for the common functions.

FIG. 3 is a flowchart of an embodiment of the invention in which common functions are found in a source document by comparing the hyperlinks of the source document with alternative terms for the common functions. Referring to this figure, the process starts at step 300, and in step 302 a source document (such as a webpage) is opened. The opening of a document includes loading the document into memory or other storage device, and may include loading it into video memory and displaying the document on a display screen.

In step 304, the process determines if the common functions for the source document that was opened in step 302 have been cached (i.e., stored in a memory, such as a temporary memory space). The caching of the common functions for a source document will be described in more detail below with respect to step 318. However, the common functions for a source document will remain in the cache for the refresh time as established in step 202, after which the cache will be flushed of all common functions for that particular source document. Other conditions may also be used to trigger a flushing of the common functions for a source document from the cache. For example, whenever a "broken" URL is detected on any of the common icons for a document. If the source document common functions for this document have been cached, the process branches to step 306 where, for each common function that has been cached for the document that was opened in step 302, a common function hyperlink is formed from the corresponding common icon (from the table of common functions) and the associated target resource locator (from the cache). The common icon for this common function hyperlink is displayed at the corresponding predetermined screen position. If the common functions for this source document have not been cached, then the process branches to step 308.

Even numbered steps 308 through 318 set forth the process whereby the hyperlinks of the source document (as well as the hyperlinks of the target documents of the hyperlinks in the source document) are compared to the various alternative terms for the common functions registered in the table of common functions. When a match is found, the target resource locator of the hyperlink that matches an alternative term is cached along with the associated common function and an identification of the source document.

In step 308, the alternative terms for the first common function are retrieved from the table of common functions. In step 310, each such alternative term is compared to each hyperlink in the source document; for example, by comparing each alternative term to each of the descriptive tags (names) of the hyperlinks. For HTML coded hyperlinks, matches may be found by string searches of the "href" code in the hyperlink. If no match is found in step 312, the process branches to step 314 to search through the next lower level of hyperlinks.

In step 314, the target documents for each of the hyperlinks in the source document are opened, and each of the hyperlinks in each of these target documents are compared to the alternative terms for the common function.

If no match is found, the process branches to step 320, where the status of this particular common icon is set to "grey", which simply means that no match for the current common function has been found. The common icon for a common function may still be displayed, even though no match has been found between the hyperlinks and the alternative terms, but the common icon may be "greyed out" (i.e., displayed in shades of grey) to indicate that no matches have been found and that the common icon is currently non-functional. Other techniques for indicating the non-functionality of the common icon may be used, such as by overlaying the common icon with the universal "no symbol" (a circle with a diagonal line through it; usually displayed in red). In the alternative, step 320 can implement a search for the common function using the website's help system.

Returning to steps 312 and 316, if a match is found between a hyperlink and an alternative term, these steps will branch the process to step 318. In step 318, when a match is found, the target resource locator of the matching hyperlink is cached and associated with the corresponding common function and an identification of the source document. If the process branches to step 318 from step 320, instead of a target resource locator being cached, a "grey status" is associated with the corresponding common function and an identification of the source document in the cache. In step 322, the process determines if the last common function from the table of common functions has been processed. If it has not, the process branches to step 324 where the alternative terms for the next common function are retrieved from the table of common functions. The process then returns to step 310 and proceeds as described above.

Returning to step 322, if the last common function in the table of common functions has been reached, the process branches to step 306. In step 306, for each common function that has been cached for this document, a common function hyperlink is formed from the corresponding common icon (from the table of common functions) and the associated target resource locator (from the cache). The common icon for this common function hyperlink is displayed at the corresponding predetermined screen position. Thus, a common function hyperlink appears on-screen at the corresponding predetermined position and, if this common function hyperlink is activated, the user will be redirected to the target resource locator. This target resource locator is the one that was associated with the hyperlink in the source document that matched an alternative term in the table of common functions.

In another embodiment of the invention, a website may embed in its home page the mapping between the common function and the associated target pages for use by the browser. When the home page is opened, a browser plugin may be used to associate these common functions with the corresponding common icons. If this embodiment of the invention is implemented in a browser plugin, the plugin should be coded to look for this mapping on the server side first (i.e., to look to the website home page first). Common function hyperlinks based on these common functions and common icons can be made available to the user as the user browses the various pages of the website.

In another embodiment, a user may further register common functions for different types of websites. For example, many grocery store websites have common functions such as weekly sales, but do not have login or logoff functions.

In another embodiment, the invention may be implemented using Cascading Style Sheets (CSS). For example, the following sample CSS code defines and displays the logout image at a specific location on a web page.

```
#logo {
background: url('images/logout.jpg') no-repeat 9px 1px;
position: absolute
top: 0
left: 0
z-index: 5;
line-height: 0;
}
```

The website wrapper system's code will be defined in the absolute method, such as:

```
<a href="images/login.jpg"><img src="images/login.jpg"
width="110" height="84" hspace="10"></a>
```

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of code, which comprises one or more executable instructions for implementing a specified logical function. It should also be noted that, in some alternative implementations, the functions noted in the block might occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method, comprising:
storing, in a storage device of a data processing system, a common icon to represent a common function of a source hyperlink, wherein the source hyperlink comprises a target resource locator that points to a target document;
storing a predetermined screen position at which to display the common icon on a display screen;
associating the common function with a plurality of alternative terms suitable to identify the common function, wherein each of the plurality of alternative terms is a different term that describes a same function of the common icon;
opening a source document comprising the source hyperlink;
finding a match between a descriptive tag in the source hyperlink and one of the plurality of alternative terms;
in response to finding the match between the descriptive tag in the source hyperlink and one of the plurality of alternative terms, forming a common function hyperlink from the common icon to the target document;
displaying, on the display screen, the source document, the common function hyperlink, and the common icon, wherein the common icon is displayed at the predetermined screen position; and
opening the target document in response to activation of the common function hyperlink.

2. The method of claim 1, where the step of forming a common function hyperlink from the common icon to the target document occurs in further response to finding the source document referenced in a cache, wherein the cache comprises data that describes an association between the source document, the common function and the target resource locator.

3. The method of claim 1, where the step of forming a common function hyperlink from the common icon to the target document occurs in further response to finding a match between a target hyperlink in the target document and one of the plurality of alternative terms.

4. The method of claim 1, further comprising storing, in a cache, an association between the source document, the common function and the target resource locator.

5. A computer program product comprising a non-transitory computer readable storage medium having computer readable program code embodied therewith, the computer readable program code comprising:
computer readable program code configured to store a common icon to represent a common function of a source hyperlink, wherein the source hyperlink comprises a target resource locator that points to a target document;
computer readable program code configured to store a predetermined screen position at which to display the common icon on a display screen;
computer readable program code configured to associate the common function with a plurality of alternative terms suitable to identify the common function, wherein each of the plurality of alternative terms is a different term that describes a same function of the common icon;
computer readable program code configured to open a source document comprising the source hyperlink;
computer readable program code configured to find a match between a descriptive tag in the source hyperlink and one of the plurality of alternative terms;
computer readable program code configured to, in response to finding the match between the descriptive tag in the source hyperlink and one of the plurality of alternative terms, form a common function hyperlink from the common icon to the target document;
computer readable program code configured to display, on the display screen, the source document, the common function hyperlink, and the common icon, wherein the common icon is displayed at the predetermined screen position; and
computer readable program code configured to open the target document in response to activation of the common function hyperlink.

6. The computer program product of claim 5, further comprising:
computer readable program code configured to find the source document referenced in a cache comprising data that describes an association between the source document, the common function and the target resource locator.

7. The computer program product of claim 5, further comprising:
computer readable program code configured to find a match between a target hyperlink in the target document and one of the plurality of alternative terms.

8. The computer program product of claim 5, further comprising:
computer readable program code configured to store, in a cache, an association between the source document, the common function and the target resource locator.

9. An apparatus, comprising:
a storage device comprising computer executable program code;
a processor coupled to the storage device, where the processor executes the computer executable program code to direct the apparatus to:
store a common icon to represent a common function of a source hyperlink, wherein the source hyperlink comprises a target resource locator that points to a target document;
store a predetermined screen position at which to display the common icon on a display screen;
associate the common function with a plurality of alternative terms suitable to identify the common function, wherein each of the plurality of alternative terms is a different term that describes a same function of the common icon;
open a source document comprising the source hyperlink;
find a match between a descriptive tag in the source hyperlink and one of the plurality of alternative terms;
in response to finding the match between the descriptive tag in the source hyperlink and one of the plurality of alternative terms, form a common function hyperlink from the common icon to the target document;
display, on the display screen, the source document, the common function hyperlink, and the common icon, wherein the common icon is displayed at the predetermined screen position; and
open the target document in response to activation of the common function hyperlink.

10. The apparatus of claim 9, where the processor further executes the computer executable program code to find the source document referenced in a cache comprising data that describes an association between the source document, the common function and the target resource locator.

11. The apparatus of claim 9, where the processor further executes the computer executable program code to find a match between a target hyperlink in the target document and one of the plurality of alternative terms.

12. The apparatus of claim 9, where the processor further executes the computer executable program code to store, in a cache, an association between the source document, the common function and the target resource locator.

* * * * *